United States Patent [19]

Menniti et al.

[11] Patent Number: 5,140,515
[45] Date of Patent: Aug. 18, 1992

[54] INDUCTIVE LOAD CURRENT CONTROLLER

[75] Inventors: Pietro Menniti, Milan; Antonella Baiocchi, Vigevano, both of Italy

[73] Assignee: SGS-Thomson Microelectronics S.r.L., Italy

[21] Appl. No.: 498,268

[22] Filed: Mar. 23, 1990

[30] Foreign Application Priority Data

Mar. 28, 1989 [IT] Italy ............... 19919 A/89

[51] Int. Cl.$^5$ ........................... H02M 7/5387
[52] U.S. Cl. ........................... 363/98; 363/132
[58] Field of Search ............... 323/316, 317; 363/17, 363/95, 97, 98, 132

[56] References Cited

U.S. PATENT DOCUMENTS

| | | | |
|---|---|---|---|
| 4,355,243 | 10/1982 | Tellert | 363/131 |
| 4,475,149 | 10/1984 | Gallios | 363/17 |
| 4,553,084 | 11/1985 | Wrathall | 323/316 |
| 4,599,554 | 7/1986 | Jaycox et al. | 323/317 |
| 4,626,760 | 12/1986 | Bui et al. | 318/696 |
| 4,710,686 | 12/1987 | Guzik | 363/98 |
| 4,777,578 | 10/1988 | Jahns | 363/132 |
| 4,777,579 | 10/1988 | Jahns et al. | 363/132 |
| 4,827,207 | 5/1989 | Chieli | 323/316 |

FOREIGN PATENT DOCUMENTS 274995 9/1985 European Pat. Off. .
155661 7/1988 European Pat. Off. .

*Primary Examiner*—Jeffrey Sterrett
*Attorney, Agent, or Firm*—Leydig, Voit & Mayer

[57] ABSTRACT

An electronic circuit for measuring and controlling an electric current flowing through an inductive electric load, being of a type which comprises a first, field-effect power transistor connected to the load and a second, sensing transistor having its source electrode connected to the source electrode of the first transistor, further comprises a voltage comparator having respective inputs connected to the corresponding drain electrodes of said transistors, and an electronic switch connected in ahead of the gate electrode of the power transistor and linked to the comparator output.

12 Claims, 3 Drawing Sheets

INDUCTIVE LOAD CURRENT CONTROLLER

FIELD OF THE INVENTION

This invention relates to an electronic circuit for measuring and controlling an electric current flowing through an inductive electric load, being of a type which comprises a first, power transistor connected to the load and powered from a driver stage, and a second, sensing transistor, both said transistors being field-effect transistors and interconnected through their respective source electrodes.

BACKGROUND OF THE INVENTION

As is well known, circuits of the above-mentioned type have their field of application in a variety of devices for controlling the electric current flowing through a load, such as regulators and limiters of the current supplied to a stepper electric motor or a generic inductive load, hereinafter denoted by an "L".

In the instance of an electronically controlled stepper motor, for example, there exists a need to independently power the respective phases of the motor by having each of them connected to a corresponding control stage which may comprise a MOS-type or bipolar transistor bridge.

Each motor phase may be viewed in the main as an inductor wherein the current would tend to increase indefinitely unless it is regulated through the bridge circuit.

Heretofore, the control phase has been implemented in the so-called chopper mode, i.e. by activating and de-activating the control stage associated with each phase of the motor based on the electric current value sensed on the inductive load by a sensing circuit.

Thus, the current flowing through the inductive load has a sawtooth form due to that, as the sensing circuit senses a current value equal to a predetermined reference value, the driver stage is de-activated to cut off the current supply. The current drops down to a second predetermined reference value and on reaching it the driver stage is activated once more.

The state of the art has provided several approaches to the problem of sensing a current flowing through a load.

The current measurement has been usually obtained indirectly by measuring the voltage drop across a resistive sensor consisting of a resistor Rs having a very low value which is connected serially to a transistor pair in the bridge circuit performing the functions of so-called high-side drivers, and accordingly having their respective drain electrodes connected to the load.

However, this prior approach has some drawbacks as pointed out below.

Its accuracy is poor because said resistor Rs and the internal resistances of the integrated sensing circuit are liable to undergo thermal drifts which differ greatly from one another, which reflects adversely on the measurement accuracy.

Further, through the resistive sensor Rs, power is dissipated in an amount equal to the product of the voltage drop thereacross by the current IL flowing through the load. To restrain that dissipation, one might think of using very low resistance values, but this would result in the need to sense voltage values just as low, for subsequent comparison with reference values generated inside the circuit.

In recent times, it has been proposed of obtaining the measurement through the use of a pair of transistors connected together through their respective drain and gate electrodes. One transistor is incorporated to the bridge driver circuit for the inductive load, and the other transistor has its source electrode grounded via the resistive sensor formed of the resistor Rs.

If the second-mentioned transistor is provided with an area which is n times smaller than that of the first-mentioned transistor, then it becomes possible to have a current flow therethrough, and hence the resistor Rs, which is 0 times lower than the current flowing through the inductive load, whereby a definitely lower amount of power would be dissipated through the electric current sensor.

However, not even this prior attempt has been entirely successful, mainly because the very presence of the resistor Rs makes the values unequal of the gate-source and drain-source voltages at the previously mentioned transistors, which are therefore under different operating conditions. This results in the electric current ratii of the two transistors becoming dependent on such different operating conditions, rather than on the ratio of their areas, which again makes the measurement inaccurate.

In an effort to obviate such a problem, a circuit structure has been proposed as described, for instance, in Italian Patent Application No. 22732-A/86 by this same Applicant.

That structure comprises a pair of field-effect transistors connected together through their respective source electrodes. A first transistor is a power transistor and connected to the load, whereas the second transistor has its drain electrode connected to a resistive current sensor. In addition, a voltage regulator is connected to the drain electrodes of the first and second transistors, respectively, to maintain equal values of the drain-source voltage on both transistors.

The latter approach, while being beneficial and substantially achieving its objective, has a shortcoming in that it requires a purposely provided circuitry to drive the transistors in the pair to operate under the same conditions.

SUMMARY OF THE INVENTION

The technical problem that underlies this invention is to provide a novel type of an electronic circuit for sensing a current flowing through an inductive load, which is specially simple construction- and function-wise and effective to overcome the cited drawbacks with which the prior art is beset.

The solutive idea on which this invention is based is one of just utilizing the inequality of the drain-source voltages of the transistor pair making up the current mirror circuit to regulate the power supply to the load accordingly.

On the basis of the above solutive idea, this technical problem is solved by a circuit of the kind specified above being characterized in that it comprises a voltage comparator having respective inputs connected to the corresponding drain electrodes of said transistors, and an electronic switch connected between the gate electrode and the driver stage of the power transistor, said electronic switch being linked to the comparator output.

The features and advantages of a circuit according to the invention will be more clearly understood from the following detailed description of an embodiment

DETAILED DESCRIPTION OF THE PREFERRED EMBODIMENTS

Figure 2:
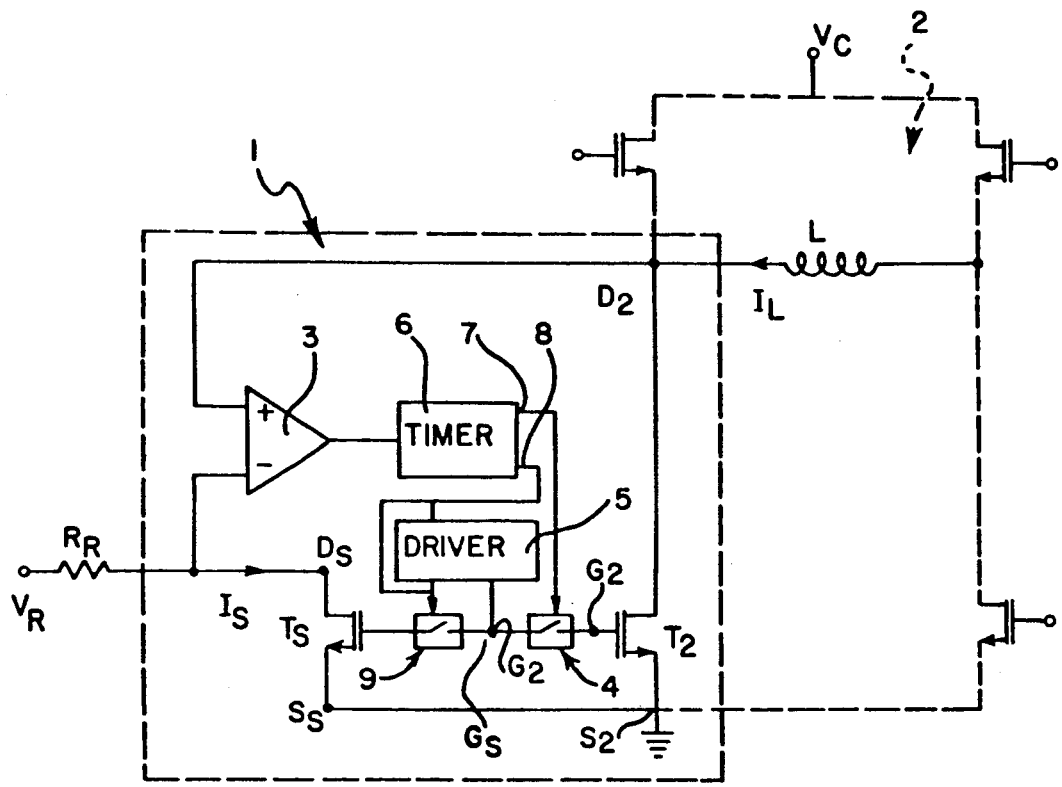
FIG. 2 is another diagrammatic view of the circuit shown in FIG. 1, in functional block form.

With reference to the drawing figures, generally and schematically indicated at 1 is an integrated electronic circuit for measuring and controlling an electric current flowing through an inductive electric load, denoted by L.

That load L may be provided, for example, by the phases of an electric stepper motor, and is powered through a bridge circuit 2 comprising field-effect power transistors of the MOS type.

The circuit 1 is associated with the bridge circuit 2, and specifically with a transistor T2 having its drain electrode D2 connected to one end of the load L.

Figure 1:
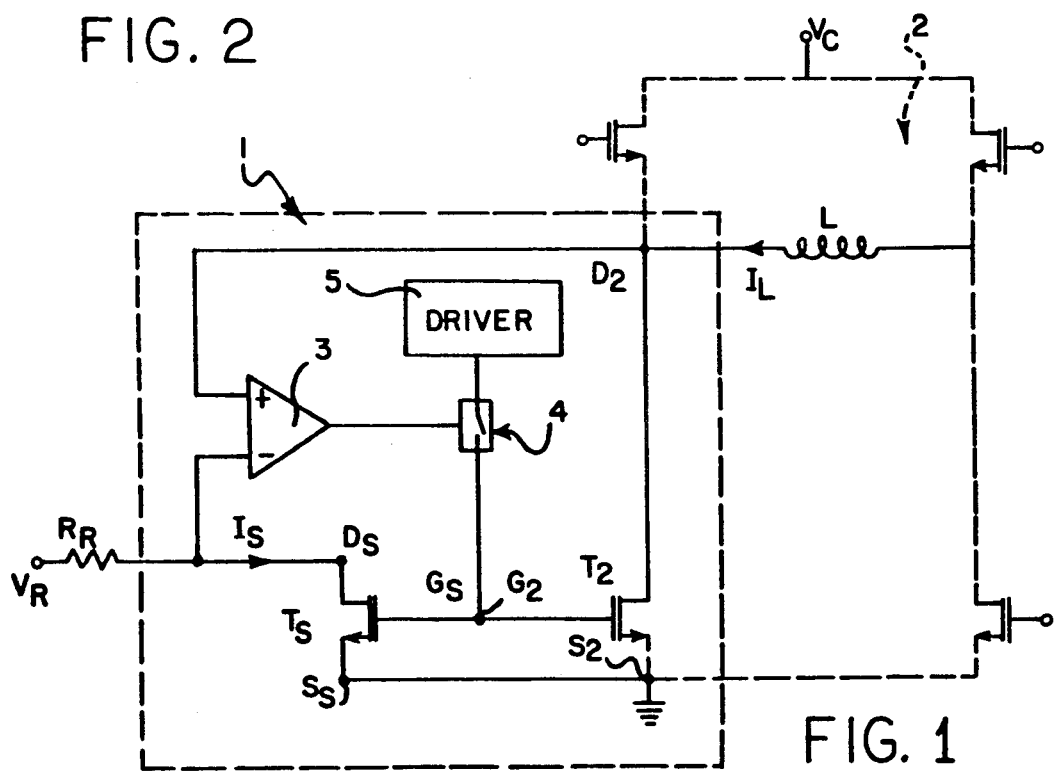
FIG. 1 shows the measuring circuit of this invention in diagrammatic form.

The circuit 1 comprises a second field-effect, sensing transistor Ts, also of the MOS type, which has its source electrode Ss connected to the source S2 of the first transistor T2 as well as to ground. Further, such transistors have their respective gate electrodes G2 and Gs connected together as shown in FIG. 1.

The circuit 1 incorporates, moreover, a comparator 3 having respective inputs connected to the corresponding drain electrodes of the first and second transistors.

In particular, the non-inverting (+) input of the comparator 3 is connected directly to the drain electrode D2 of the first transistor T2, whereas the inverting (−) input of that comparator 3 is connected to the drain electrode Ds of the second transistor Ts. Advantageously, the drain electrode of that second transistor Ts is connected, externally of the circuit 1, to a reference voltage Vr pole via an external reference resistance Rr. In a preferred embodiment, such external components are formed by a reference current Ir source as shown in FIG. 3, for example.

The output of the comparator 3 is connected to drive an electronic switch 4 connected between the output of a driver stage 5, for switching the power transistor T2 on and off, and the gate electrode D2 of that transistor T2.

Figure 3:
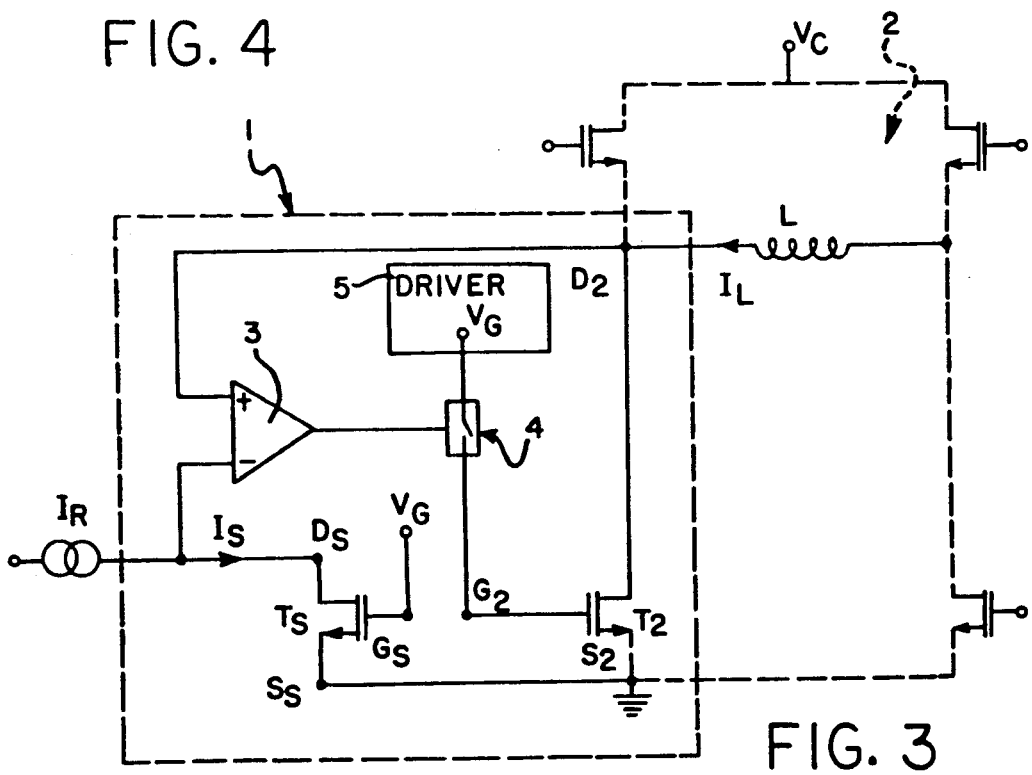
Figure 5:
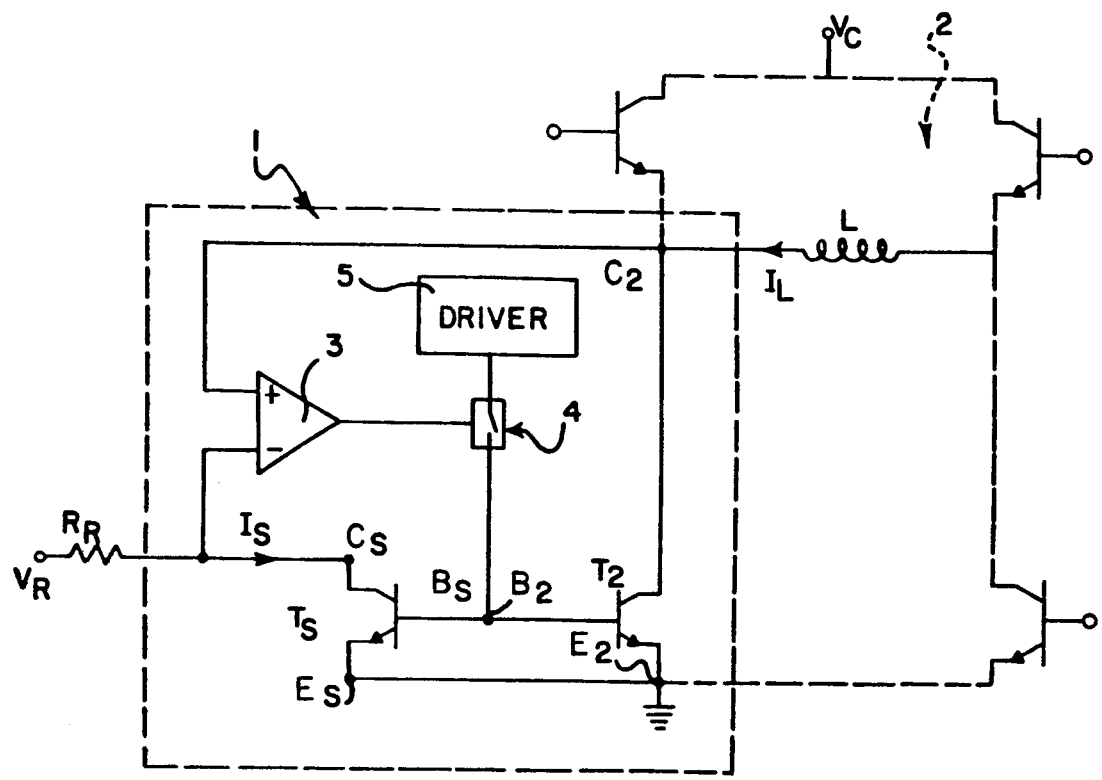

In a preferred embodiment shown in FIG. 3, the gate G2 of the first transistor T2 is connected to a voltage supply pole Vg incorporated to the stage 5, and is connected to that pole in linked relationship with the switch 4.

The gate electrode Gs of the sensing transistor Ts is connected instead directly to said supply pole Vg such that, with the power transistor T2 switched on, via the switch 4, identical gate-source voltage values will appear at both transistors.

It should be noted, moreover, that the area of the second transistor Ts has been selected to suit the area of the power transistor T2 and such that the internal resistance Rts of the sensing transistor Ts is 0 times higher than the internal resistance of transistor T2.

In operation, the voltage levels which appear at the respective inputs of the comparator 3 would be equal to the respective drain-source voltage drops of the transistors T2 and Ts, respectively.

Such voltage values may be expressed as the product of the current flowing through each transistor by the corresponding internal resistance thereof.

Since we are also allowed to express the value of the voltage appearing at the inverting input of the comparator 3 as a function of the reference voltage Vr and resistance Rr values, or of the current Ir from the reference source, it can be shown that the value of the current Is flowing through the second transistor Ts is given by the following relation:

$$Is = Vr/(Rr + Rts) = Ir = Vr/Rr$$

where, Rts is the value of the internal resistance through the second transistor Ts and may be adjusted in amount with high accuracy and so as to make it negligible compared to the resistance Rr external of the circuit 1.

In contrast with what occurs with prior circuits, the value of the current Is flowing through the transistor Ts will depend essentially on the values of the reference voltage Vr and resistance Rr, which can be made as accurate as desired through their being supplied by components external of the integrated circuit 1.

The circuit of this invention is of great structural simplicity, and employs components in extremely small number which provide accuracy to a high degree. In addition, this circuit dissipates a reduced amount of electric power.

In a modified embodiment shown in FIG. 2, wherein cooperating items and parts similar in structure and function to the previous embodiment are denoted by the same reference characters and numerals, the output from the comparator 3 is applied directly to the input of a timer circuit 6 effective to output, on one or more outputs thereof, signals which are delayed according to a predetermined timing arrangement.

This timing arrangement 6 may be just a counter, for example.

The circuit 6 has a pair of outputs 7 and 8 respectively connected to control a pair of electronic switches, of which a first, denoted by 4 like in the previous embodiment, is connected in ahead of the gate G2, and the second 9 is connected in ahead of the gate Gs of the second transistor.

Figure 4:
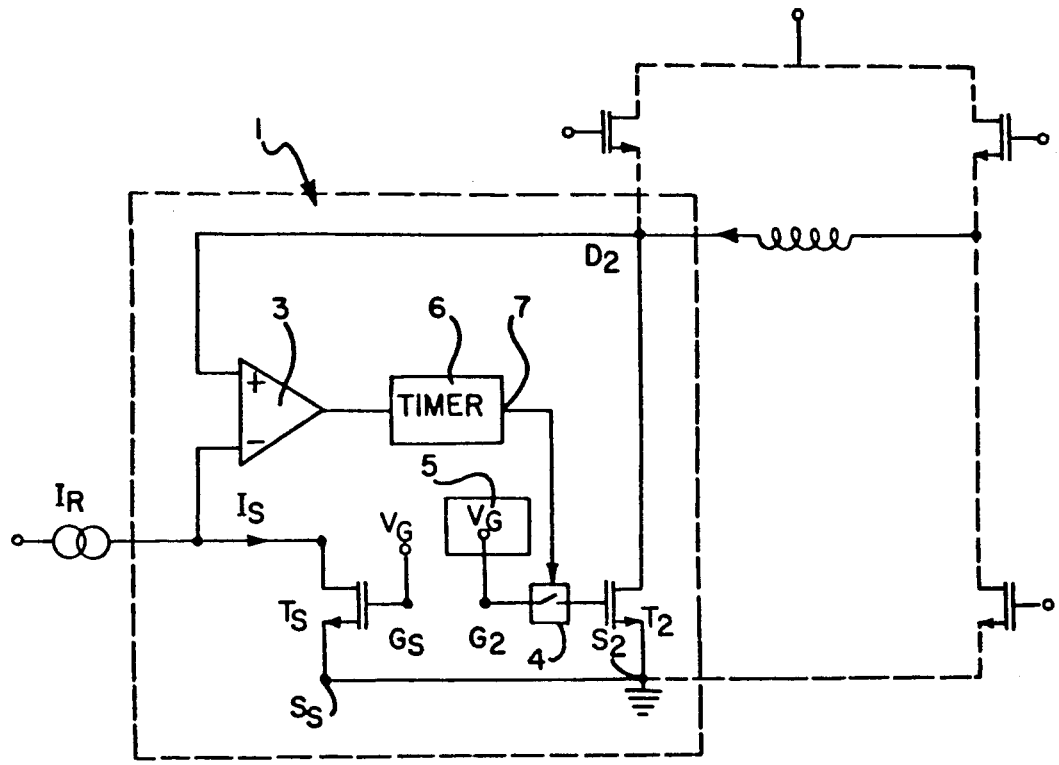
FIGS. 3, 4 and 5 show diagrammatically modified embodiments of the inventive circuit.

In a further embodiment shown in FIG. 4, the timer 6 has just the output 7 connected to the switch 4, whereas the gate Gs of the sensing transistor Ts is connected fixedly to the voltage supply pole Vg.

The provision for a timer 6 enables a minimal conduction time to be ensured for the power transistor T2 even in the presence of so-called spurious signals at the non-inverting input of the comparator 3, e.g. the moment the power transistor goes from the off to the on state.

To the inverting input of the comparator 3, there is supplied a reference current Ir which is either regulated by the values of the reference voltage Vr and resistance or by the current source Ir.

The provision for the switch 9 allows the turning on of the power transistor T2 and the second transistor Ts to be differentiated based on the circuit 6 timing and such that the sensing transistor be also conducting while the power transistor is off. However, the sensing transistor can be held in conduction at all times, as shown in FIG. 4.

Understandably, by simple adaptations well known to the skilled one, a single circuit 1 according to the invention could be used to sense and control the load current of plural transistors, provided that a suitable timer device be arranged to control the circuit cut-in times.

Additionally thereto, the inventive circuit may be formed, in any of its embodiment forms, from bipolar transistors operating in saturation. In that case, the bridge circuit 2 and sensing circuit 1 would both comprise bipolar transistors connected such that their respective bases correspond with the gates of the previously discussed field-effect transistors, whilst the collectors and emitters would be arranged to match the drain and source electrodes, respectively.

We claim:

1. In an electronic circuit for measuring and controlling an electric current flowing through an inductive electric load, the electronic circuit being of a type which comprises a first, power transistor connected to the load and powered from a driver stage, and a second, sensing transistor, both said transistors being field-effect transistors and interconnected through their respective source electrodes, the improvement comprising a voltage comparator having respective inputs connected to the corresponding drain electrodes of said transistors, an electronic switch connected between the gate electrode and the driver stage of the power transistor, said electronic switch being driven in response to the comparator output for controllably coupling the driver stage to the gate electrode of the power transistor, the drain electrode of the second transistor also being connected to a reference voltage supply pole through a resistor having a predetermined resistive value.

2. A circuit according to claim 1, characterized in that it comprises a timer connected to the comparator output and having at least one pair of outputs connected to control respective electronic switches, of which one is connected in ahead of the gate of the power transistor and the second is connected in ahead of the gate of the second transistor.

3. A circuit according to claim 1, characterized in that the reference voltage supply pole and resistor comprise an external reference current source.

4. A circuit according to claim 1, characterized in that it comprises a timer connected to the comparator output and having an output connected to control said electronic switch.

5. A circuit according to claim 4, characterized in that said sensing transistor has its gate electrode permanently connected to a voltage supply pole.

6. A circuit according to claim 1, characterized in that said sensing transistor has its gate electrode permanently connected to a voltage supply pole.

7. In an electronic circuit for measuring and controlling an electric current flowing through an inductive electric load, the electronic circuit being of a type which comprises a first, bipolar power transistor connected to the load and powered from a driver stage, and a second, sensing transistor, said transistors being connected together through their respective emitter electrodes, the improvement comprising a voltage comparator having respective inputs connected to the corresponding collector electrodes of said transistors, an electronic switch connected between the base and the driver stage of the power transistor, said electronic switch being driven in response to the comparator output for controllably coupling the driver stage to the base of the power transistor, the collector electrode of the second transistor also being connected to a reference voltage supply pole through a resistor having a predetermined resistive value.

8. A circuit according to claim 7, characterized in that it comprises a timer connected to the comparator output and having at least one pair of outputs connected to control respective electronic switches, of which one is connected in ahead of the base of the power transistor and the other is connected in ahead of the base of the second transistor.

9. A circuit according to claim 7, characterized in that said sensing transistor has its base permanently connected to a voltage supply pole.

10. A circuit according to claim 7, characterized in that the reference voltage supply pole and resistor comprise an external reference current source.

11. A circuit according to claim 7, characterized in that it comprises a timer connected to the comparator output and having an output connected to control said electronic switch.

12. A circuit according to claim 11, characterized in that said sensing transistor has its base permanently connected to a voltage supply pole.

* * * * *